United States Patent Office.

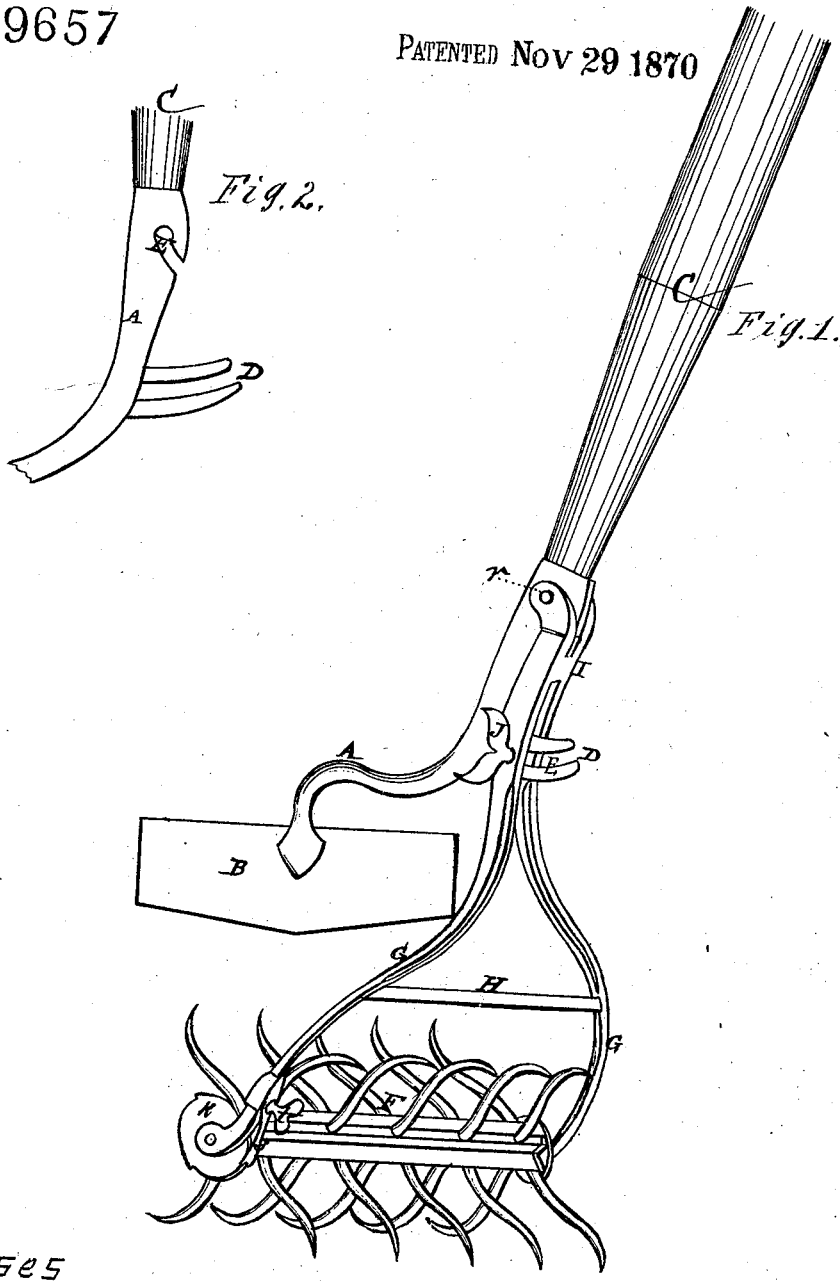

LOUIS PERROT, OF GREENVILLE, AND FRANK PERROT AND CHARLES H. BATES, OF APPLETON, WISCONSIN.

Letters Patent No. 109,657, dated November 29, 1870.

IMPROVEMENT IN COMBINED GARDEN TOOLS.

The Schedule referred to in these Letters Patent and making part of the same.

We, LOUIS PERROT, of Greenville, and FRANK PERROT and CHARLES H. BATES, of Appleton, in Outagamie county, Wisconsin, have invented certain Improvements in Garden Tools, of which the following is a specification.

The object of our invention is to provide an implement that may be used as a hoe, as a rake, or as a cultivator, or for the purposes of two or more of these tools at the same time; and It consists in attaching to the same handle a hoe and a cultivator, which may also be used as a rake; and in certain devices, by means of which the different parts of the implement are connected, adjusted, and operated, as will be fully set forth below.

In the accompanying drawing, forming part of this specification—

Figure 1 is a perspective view of our improved implement; and

Figure 2, a side view of the shank of the hoe.

The shank A of the hoe B is secured, in some suitable manner, to the handle C, and is provided with the spurs D and the slot or recess E.

The cultivator or rake F is pivoted between the ends of the arms G, which are connected by the bar H, and also at I, where they may form a single bar for a short distance.

At the rear end, where they are separate again, they are connected by a bolt or pivot, r, adapted to fit into the recess E; and on the opposite side of the connection I a set-screw, J, passes through one of said arms and screws into the other, it being so arranged as to pass between the spurs D, when the pivot r has fully entered the recess E; then by turning the screw J the spurs may be pinched between the arms G, and the cultivator F firmly secured upon the shank A.

By loosening the screw J the distance of the cultivator or rake from the hoe may be varied and adjusted at pleasure, or it may be turned back upon the handle or detached from the shank altogether, as may be preferred.

By varying the distance between the hoe and the cultivator, as above described, the angle which the blade or plate of the hoe shall make with the surface of the ground, when both the hoe and cultivator are in operation, may be varied and adjusted as required.

The end-plate K of the cultivator F is provided with ratchet-teeth, as shown, and a spring, s, is fastened upon the arm G, which spring may be pressed down upon the edge of said plate by a set-screw, t, so as to take the ratchet-teeth and prevent the cultivator from revolving, except in one direction, when it may be conveniently used as a rake, or as a rake and cultivator at the same time.

It is obvious that, by a similar or equivalent device, the cultivator may be prevented from revolving in either direction, if preferred.

What we claim as our invention is—

The means of combining the rotating cultivator F and hoe B, consisting of the shank A, pivot r, frame I G H, spurs D, recess E, set-screw J, plate K, spring s, and screw t, substantially as described.

LOUIS PERROT.
F. PERROT.
C. H. BATES.

Witnesses:
JOHN B. JACQUOT,
LEWIS BATES.